United States Patent [19]

Herbert

[11] 4,346,795

[45] Aug. 31, 1982

[54] ENERGY ABSORBING ASSEMBLY

[75] Inventor: Donald L. Herbert, Lexington, Ohio

[73] Assignee: Harvey Hubbell Incorporated, Orange, Conn.

[21] Appl. No.: 162,053

[22] Filed: Jun. 23, 1980

[51] Int. Cl.³ .............................................. F16F 7/12
[52] U.S. Cl. ...................................... 188/375; 74/492; 293/133; 409/310
[58] Field of Search .................. 188/196 R, 375, 376; 74/492, 493; 291/1, 133; 409/310; 408/6, DIG. 710

[56] References Cited

U.S. PATENT DOCUMENTS

| 1,315,100 | 9/1919 | Dufresne | 408/710 X |
|---|---|---|---|
| 1,681,288 | 8/1928 | Galloway | 408/710 X |
| 1,765,200 | 6/1930 | Bullough | |
| 2,277,881 | 3/1942 | Olander | |
| 2,615,373 | 10/1952 | Pegard | |
| 2,802,580 | 8/1957 | Larsson | |
| 2,811,385 | 10/1957 | Butler | |
| 2,837,176 | 6/1958 | Dropkin | |
| 3,097,725 | 7/1963 | Peterson | |
| 3,168,004 | 2/1965 | Zavodny, Jr. et al. | 409/310 X |
| 3,305,452 | 2/1967 | Remoleur | |
| 3,477,342 | 11/1969 | McMichael, Jr. | 409/310 |
| 3,538,785 | 11/1970 | Grancon | 74/492 |
| 3,610,434 | 10/1971 | Herbert | |
| 3,751,089 | 8/1973 | Lefeuvre | |
| 3,779,591 | 12/1973 | Roads | 293/133 |
| 3,862,669 | 1/1975 | Lindbert et al. | 188/376 X |
| 3,968,862 | 7/1976 | Gorges et al. | 188/376 |

FOREIGN PATENT DOCUMENTS 689878 10/1979 U.S.S.R. ............................. 74/492

Primary Examiner—George E. A. Halvosa
Attorney, Agent, or Firm—Jerry M. Presson

[57] ABSTRACT

An assembly for absorbing energy between first and second bodies subject to relative movement comprising a cutting ring on one of the bodies dimensioned to cut into and remove a layer from a cylindrical member on the other body. The ring has an annular cutting edge with an inner diameter smaller than the outer diameter of the cylinder member. The two bodies can be, for example, two tubes forming a coupling device between two railroad cars. The outer surface of the cylindrical member can have longitudinal grooves to promote small chip formation during the cutting operation, thereby reducing the chance of jamming.

3 Claims, 11 Drawing Figures

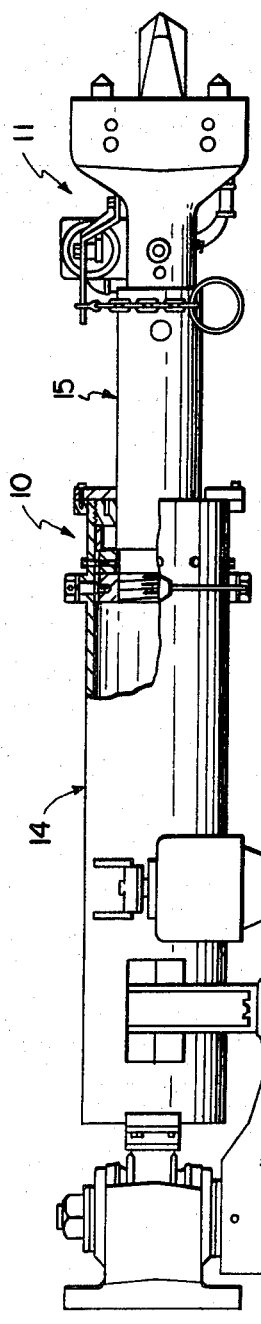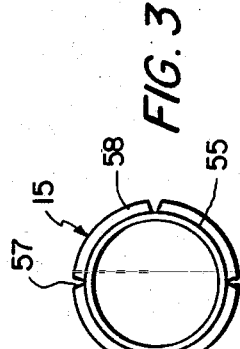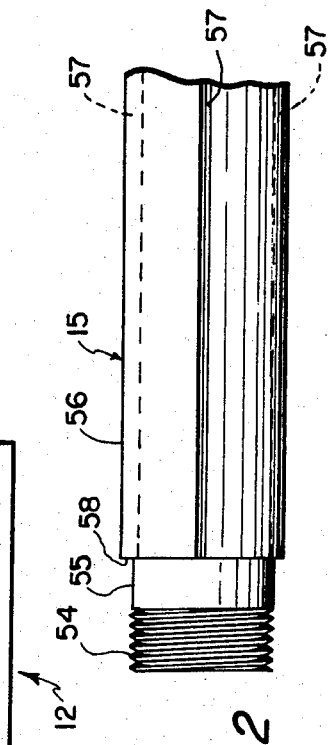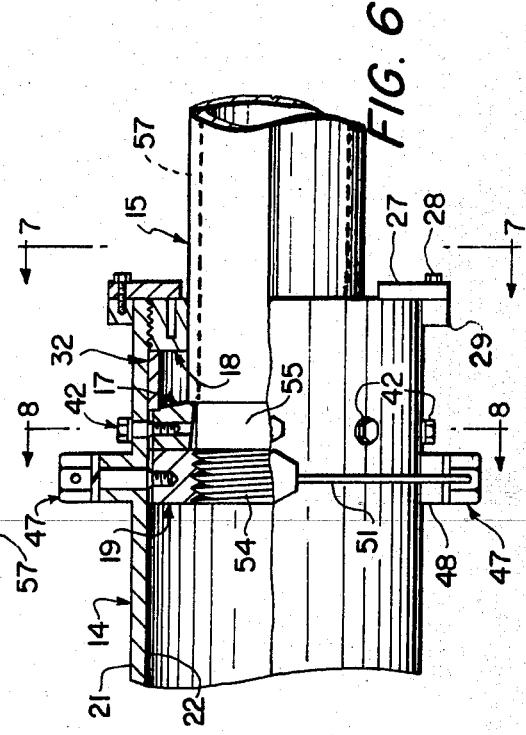

ENERGY ABSORBING ASSEMBLY

FIELD OF THE INVENTION

The present invention relates to an assembly for absorbing energy between first and second bodies subject to relative movement. More particularly, the invention relates to an energy absorbing assembly located in a coupling device for two cars, such as two railroad cars. The assembly comprises a cutting ring on one of the bodies dimensioned to cut into and remove a layer from a cylindrical member on the other body when these bodies are subject to relative axial movement.

BACKGROUND OF THE INVENTION

During the normal operation of railroad cars, the conventional draft gear coupling adjacent cars together can accept the compression or buff loads tending to move these cars together. These loads can be on the order of 65,000 to 75,000 pounds. However, under emergency stopping operation or in the event of collision, the conventional couplings cannot accept the greatly increased buff forces and therefore cannot absorb the kinetic energy tending to move the cars together. Thus, the cars can override the coupling resulting in collision therebetween and potential injury to passengers.

While there have been prior art energy absorbing devices used in conjunction with conventional draft gear couplings or by themselves, none of these are completely satisfactory. Thus, some of these prior art devices do not uniformly absorb high energy loads and therefore are unreliable and unpredictable. In addition, many of these prior art devices are not easily adjustable for various conditions and therefore can fail when encountering extremely high buff forces. Moreover, many of these prior art devices are subject to jamming.

Examples of these prior art devices for absorbing energy between relative movement of two bodies are disclosed in the following U.S. Pat. Nos. 1,765,200, issued to Bullough on June 17, 1930; 2,277,881, issued to Olander on Mar. 31, 1942; 2,615,373, issued to Pegard on Oct. 28, 1952; 2,802,580, issued to Larsson on Aug. 13, 1957; 2,811,385, issued to Butler on Oct. 29, 1957; 2,837,176, issued to Dropkin on June 3, 1958; 3,097,725, issued to Peterson on July 16, 1963; 3,305,452, issued to Remoleur on Feb. 21, 1967; and 3,751,089, issued to Lefeuvre on Aug. 7, 1973.

The Larsson patent discloses a conventional coupler for railroad cars which merely has shearable bolts, which shear when the buff forces reach a predetermined value; however, this device does not provide a uniform energy absorption between the cars. The Pegard patent discloses a safety stopping device for movable machine-tool members comprising an annular member receiving a frustoconical section on another relatively movable member; however, this device does not provide a uniform or predictable absorption of energy. A similar problem is found in the Lefeuvre patent which in FIG. 3 discloses a plurality of hooks on a first member engaged in a plurality of apertures in a second member, whereby energy is absorbed upon relative movement of the two members by a ripping of the member having the apertures therein by means of the hooks engaged therein.

SUMMARY

Accordingly, it is a primary object of the present invention to provide an energy absorbing assembly for two bodies subject to relative movement which is uniform and predictable.

Another object of the present invention is to provide such an assembly which is easy to adjust for various different loads.

Another object of the present invention is to provide such an assembly which resists jamming.

The foregoing objects are basically attained by providing an assembly for absorbing energy between first and second bodies subject to relative movement, the combination comprising a cutting element rigidly coupled to the first body, the cutting element having a substantially circular aperture with an annular cutting edge defined thereby, the second body including a cylindrical member having an outer diameter greater than the inner diameter of the cutting edge, and means coupled to at least one of the first and second bodies for coaxially aligning and guiding the cylindrical member and the cutting edge during relative movement thereof, whereby, upon subjection of the two bodies to relative movement, the cutting edge cuts into and removes a layer of the cylindrical member thereby absorbing at least a part of the energy tending to move the two bodies.

Because of this construction, a very uniform absorption of energy between the two bodies is obtained and the energy absorption is very predictable being based on the length of the cylindrical member cut by the cutting edge and the depth of the cut. Advantageously, the cylindrical member has a plurality of longitudinal grooves in the outer surface which results in small chip formation during the cutting operation, thereby reducing the chance of jamming.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this original disclosure:

FIG. 1 is a side elevational view of the present invention incorporated in a coupling device for railroad cars;

FIG. 2 is a fragmentary side elevational view of the tube which is to be cut by the cutting ring in accordance with the present invention;

FIG. 3 is a left end elevational view of the tube shown in FIG. 2;

FIG. 4 is an end elevational view of the cutting ring in accordance with the present invention;

FIG. 5 is a side elevational view in section taken along lines 5—5 in FIG. 4 of the cutting ring;

FIG. 6 is a side elevational view with portions broken away showing the apparatus in accordance with the present invention on a scale enlarged from that shown in FIG. 1;

DETAILED DESCRIPTION OF THE INVENTION

Figure 7:
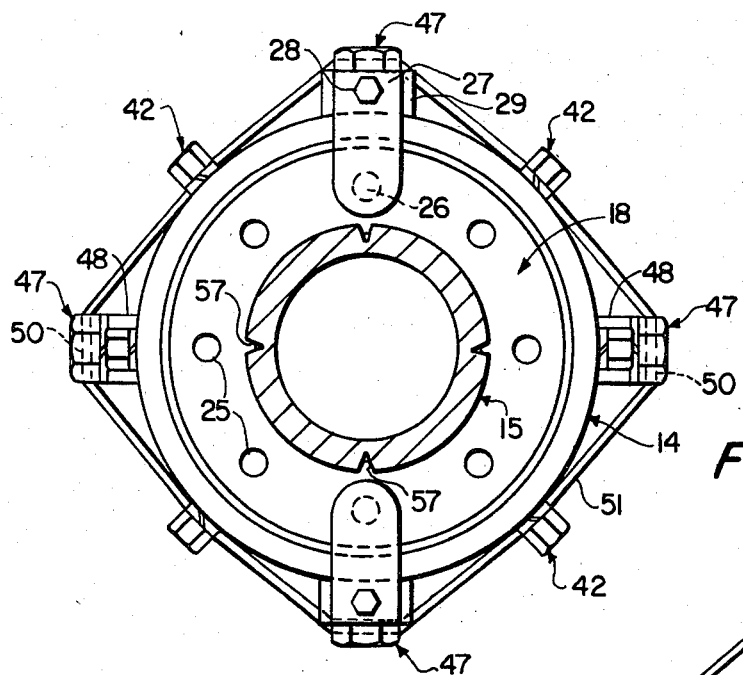
FIG. 7 is an end elevational view in section taken along lines 7—7 in FIG. 6.

As seen in FIG. 1, the energy absorbing assembly 10 in accordance with the present invention is incorporated in a coupling device such as for two railroad cars. This device comprises a mechanical coupler 11 to be connected to one railroad car and a coupler support mechanism 12 to be coupled to another car.

The energy absorbing assembly 10 is intended to absorb energy between the first body 14 and the second body 15 when they are subjected to relative movement, the first body 14 being coupled to coupler support mechanism 12 and the second body 15 being coupled to the mechanical coupler 11.

As seen in FIGS. 1 and 6, the first body 14 is in the form of a cylindrical tube and the second body 15 is also in the form of a cylindrical tube having a smaller outer diameter than the first body 14 and being telescopically received therein.

The energy absorbing assembly 10 comprises a cutting ring 17 rigidly supported inside the first body 14, a first guide ring 18 rigidly supported inside the first body 14 and receiving the second body 15 therein, and a second guide ring 19 rigidly supported inside the first body 14 and coupled to the outside of an end of the second body 15. These guide rings coaxially align and guide the second body 15 and the cutting ring 17 during relative movement thereof to assure a uniform cutting and removal of a layer of the second body 15 by the cutting ring 17 to absorb at least a part of the energy tending to move two bodies.

As seen in FIGS. 6, 7, 8 and 9, the first body 14 is in the form of a cylindrical tube having a cylindrical outer surface 21 and a cylindrical inner surface 22. At the end of the first body 14 and extending inwardly in the axial direction are internal threads 23 which threadedly engage exterior threads 24 on the outer periphery of the annular first guide ring 18. The inner diameter of this first guide ring 18 is substantially equal to the outer diameter of the second tube 15 so relative axial movement therebetween is possible.

Figure 9:
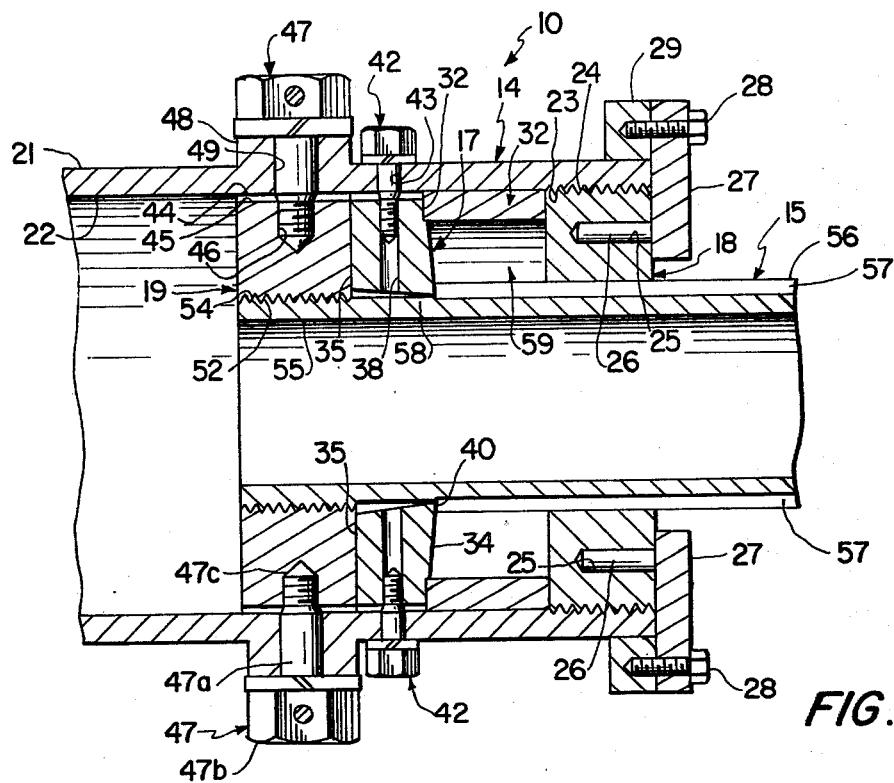
FIG. 9 is a vertical longitudinal section in side elevation of the apparatus shown in FIG. 6 but on a somewhat larger scale before relative movement between the two tubes shown therein.

The first guide ring 18 has a series of eight equally radially spaced blind bores 25 in the face thereof adjacent the end of first body 14, as best seen in FIGS. 7 and 9. Two of these blind bores 25 each receive a rod 26 which is rigidly coupled to an external bar 27 which is in turn coupled by a bolt 28 to a plate 29 rigidly supported on the outer surface 21 of the first body 14 adjacent the end thereof. This connection helps to resist relative rotation of the first body 14 and the first guide ring 18.

A spacing ring 32 is located inside the first body 14 in flush engagement with the inner surface 22 with one of its ends in flush engagement with the side of the first guide ring 18. The inner diameter of the spacing ring is greater than the outer diameter of the second body 15 and is also greater than the inner diameter of the cutting ring 17, as clearly seen in FIG. 9.

The cutting ring or element 17, as seen by itself in FIG. 4, has a frustoconical leading face 34 and a planar, annular trailing face 35. The leading face tapers inwardly at an angle of about 5° to about 10°. The outer periphery of the cutting ring 17 is interrupted by eight longitudinal slots 37 which have centrally located therein and extending completely radially through the cutting ring 17 eight threaded bores 38. The inner surface 39 of the cutting ring 17 is frustoconical and tapers inwardly and towards the leading face at an angle of about 5° to about 10°. This inner surface 39, the trailing face 35 and the leading face 34 define a substantially circular aperture in the cutting ring 17 and at the smallest diameter defined by the inner surface and the leading face there is defined an annular cutting edge 40. A circumferential annular recess 41 is defined in the outer periphery of the leading face 34 of the cutting ring, the recess having a configuration, as seen in FIG. 9, to receive an end of the spacing ring 32 in intimate contact.

Figure 8:
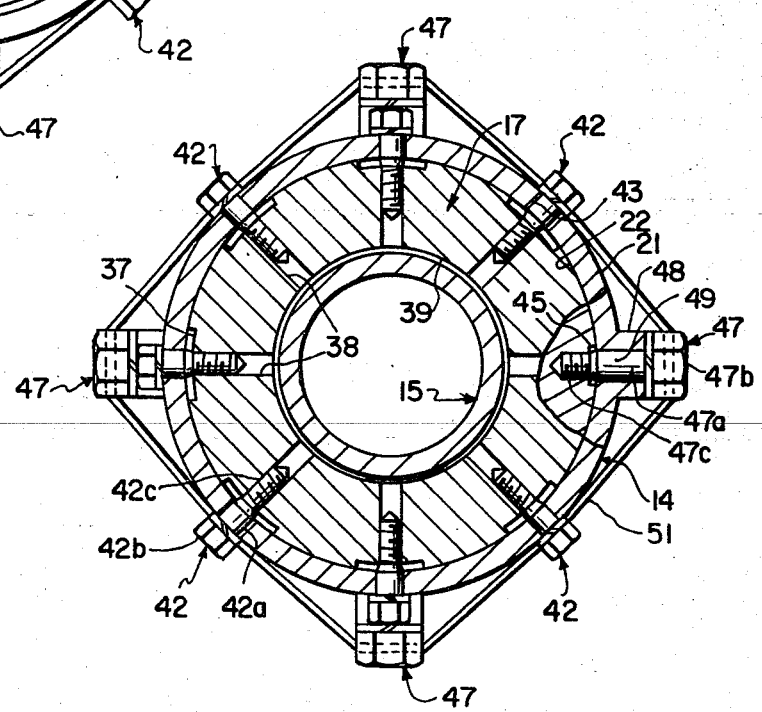
FIG. 8 is an end elevational view in section taken along lines 8—8 in FIG. 6 showing the inside of the cutting ring in accordance with the present invention.

As seen in FIGS. 6, 8 and 9, the cutting ring 17 has an outer periphery substantially equal to the diameter of the inner surface 22 of the first body 14 and is rigidly coupled to the inside of body 14 in contact with the spacing ring 32 by means of eight shearable bolts 42 passing through eight bores 43 in the wall of the first body 14. These shearable bolts 42 comprise two pieces, the first being an internally threaded sleeve 42a integrally formed with head 42b and the second being an externally threaded stud 42c threaded into the sleeve. This concept is disclosed in U.S. Pat. No. 3,610,434 issued on Oct. 5, 1971, to the inventor herein, the disclosure of that patent hereby being incorporated by reference. The studs 42c are threadedly received in the radial threaded bores 38 in the cutting ring 17. Advantageously, these shearable bolts 42 will resist transverse forces up to about 100,000 pounds. However, when such forces in excess of that amount act on the cutting ring 17, the studs in the shearable bolts will shear to prevent complete jamming of the energy absorbing assembly 10, to be described in more detail hereinafter.

As seen in FIGS. 6, 8 and 9, immediately adjacent the trailing face 35 of the cutting ring 17 is the second guide ring 19 which has annular, planar leading and trailing faces and a cylindrical outer surface in intimate contact with the inner surface 32 of the first body 14. This outer surface 44 thus has a diameter substantially equal to the inner diameter of the first body 14 so that relative axial movement therebetween is possible. As seen in FIGS. 7, 8 and 9, the second guide ring 19 has four equally radially spaced threaded blind bores 46 extending radially inward from four recesses 45 in the outer surface 44 thereof. Four shearable bolts 47 pass through bores 49 in four bosses 48 extending from the surface 21 of body 14 and are threadedly received in the four blind bores 46. The four shearable bolts 47 are each comprised of a threaded sleeve 47a, a head 47b integrally coupled to the sleeve and a threaded stud 47c received in the sleeve and bores 46 which construction is the same as bolts 42. The heads 47b of these shearable bolts 47 have transverse bores 50, as seen in FIG. 7, for the reception of a safety wire 51 coupling all of the bolts together. This wire is provided so that when the bolts 47 shear the heads do not fall from the first body 14. Bolts 42, although not shown, could also have such a safety wire connecting them.

These shearable bolts 47 advantageously shear when exposed to a force of about 75,000 pounds and therefore the second guide ring 19 will move relative to the first body 14 when such a force acts on the ring after shearing the bolts.

As seen in FIG. 9, the inner surface 52 of the second guide ring 19 is threaded to receive corresponding external threads 54 on a reduced or recessed end portion 55 of the second body 15. Thus, the second guide ring 19 is rigidly coupled to the end of the second body 15.

As seen in FIGS. 2, 3 and 9, the second body 15 is in the form of a cylindrical tube with an outer diameter of the outer cylindrical surface 56 thereof greater than the inner diameter of the cutting edge 40 on the cutting ring 17. Defined in the outer surface of the second body 15 are four longitudinally extending grooves 57, which as seen in FIG. 9 advantageously extend inwardly of the second body 15 to a position deeper than the inner radius of the cutting edge 40 and also deeper than the recess 55 in the end of the body itself. As seen in FIG. 9, the cutting edge 40 is received in the recess 55 and has an inner diameter substantially equal to the outer diameter of the recess 55. The cutting edge 40 rests against the annular radial shoulder 58 where the recess 55 meets the enlarged outer surface of the second body 15 where the longitudinal grooves 57 begin.

Preferably, the second body 15 which will be cut and have a layer removed by the cutting ring 17 is made of AISI-1117 leaded steel or advantageously 1045 steel or Ledloy AX. With an outer diameter of the second body 15 being 1.000 inches, it is advantageous to have the inner diameter of the cutting edge 40 about 0.955 inches with a machining variance of −0.004 inches. In this regard, it is also advantageous to have at least 11 inches of longitudinal extent for the second body 15 to be cut by the cutting edge 40. While the diameter of the second body and the cutting ring can vary depending on the forces and applications to be encountered, a second body outer diameter of 4.379 inches is advantageous for purposes of rigidity. The ring diameter in this case is advantageously 4.333 inches.

As seen in FIG. 9, an annular chamber 59 is defined between, in the axial direction, the cutting ring 17 and the first guide ring 18, and in the radial direction the spacing ring 32 and the outer surface 56 of the second body 15. This chamber 59 receives chips or other similar small parts of the outer layer of the second body cut by the cutting edge 40 when the first and second bodies are subjected to relative movement. The grooves 57 aid in formation of these small parts or chips to resist jamming of the mechanism which would be more likely to occur if the cutting edge 40 cut annular layers from the second body rather than smaller parts formed with the aid of these grooves.

Operation

Referring now to FIG. 9, the energy absorbing assembly 10 is shown in its rest position with the second body 15 being telescopically received in the first body 14.

Figure 10:
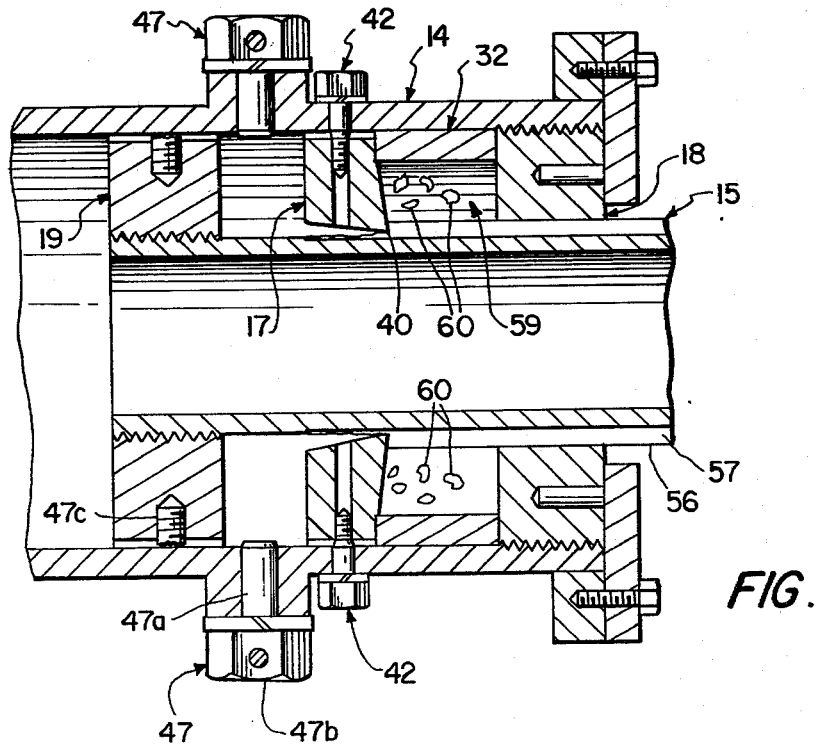
FIG. 10 is a vertical longitudinal sectional view in side elevation similar to that shown in FIG. 9 except that the two tubes have been subjected to relative movement and the cutting ring has cut into the tube.

When the first and second bodies are subjected to relative movement tending to move the second body 15 to the left as viewed in FIG. 9 and the first body 15 to the right, this force will be resisted by the threaded coupling of the second body 15 to the second guide ring 19 which is rigidly attached to the first body 14 via shearable bolts 47. Such forces when thay are in the range of about 65,000 pounds will be absorbed by the conventional draft gear coupling normally provided between two railroad cars. However, when, in the case of an emergency or a collision, the forces tending to relatively move the first and second bodies approach and then exceed about 75,000 pounds, then the shearable bolts 47 will shear and relative movement of the first and second bodies will take place as seen in FIG. 10.

As this relative movement takes place, the cutting edge 40 of the cutting ring 17 will cut into and remove a layer of the outer surface 56 of the second body 15 and will continue to do such as long as relative movement continues. The layer cut from the second body 15 will be reduced to small parts or chips 60, as seen in FIG. 10, due to the grooves 57 in the second body 15. These chips will be received in the annular chamber 59 adjacent the cutting ring 17.

This relative movement will continue and the cutting and removing will also continue until the cutting ring 17 has cut a sufficient amount of the second body 15 to absorb the energy tending to relatively move the first and second bodies 14 and 15. Since the thickness of the cut portion of the second body 15 and its length can be varied, the amount of energy absorbed by relative movement of the first and second bodies by the cutting action can be adjusted over a wide range and is very predictable.

This cutting action is also very uniform in that for every given increment of relative movement, the energy absorption is essentially constant. This also adds to the predictability of the energy absorbing assembly and aids in setting the required parameters for any given set of first and second bodies and cutting ring.

Figure 11:
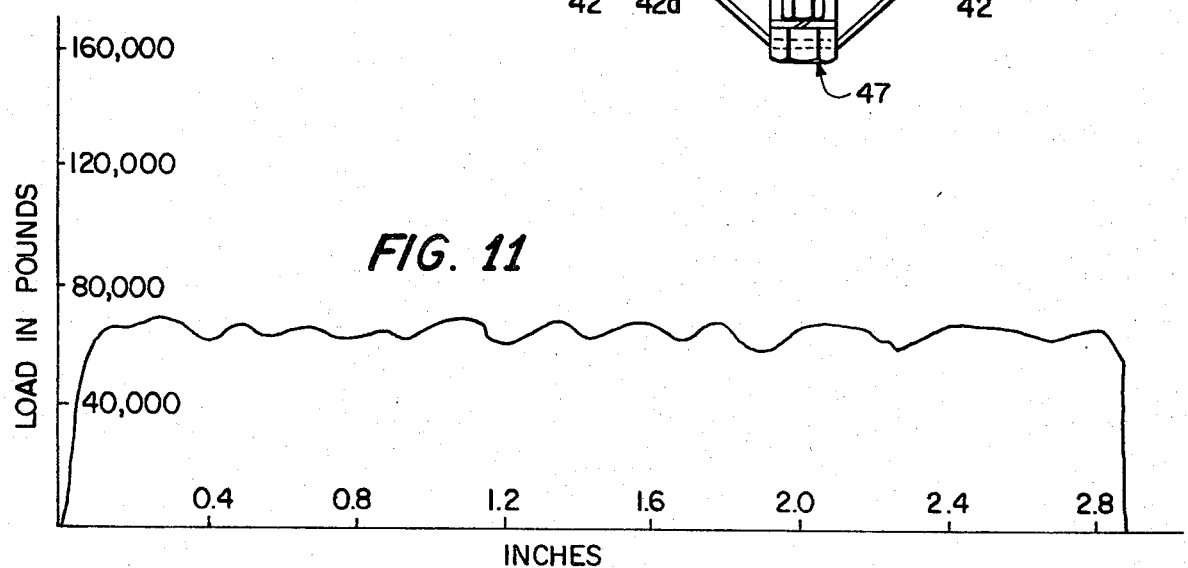
FIG. 11 is a graph showing an example of the energy absorption of the present invention.

The results of tests of the energy absorbing assembly in accordance with the present invention are shown in FIG. 11 in which the relative displacement of a second body 15 and a cutting ring 17 was initiated and the energy absorption over about 75,000 pounds remained constant for a displacement of about 2.8 inches, at which time relative movement stopped. In the case of the apparatus used to compile the data of FIG. 11, the cutting ring inner diameter was 4.333 inches and the second body 15 outer diameter was 4.374 inches, the angle of the leading face 34 of the cutting ring being about 5°.

If the buff forces tending to relatively move the first and second bodies 14 and 15 exceed 100,000 pounds, then the shearable bolts 42 coupling the cutting ring 17 to the first body 14 will be sheared so as to prevent a jamming of the assembly. This also allows the conventional anticlimbers on adjacent sides of the railroad cars to engage, such forces usually only being experienced during a collision or a significant derailment.

While one advantageous embodiment has been chosen to illustrate the invention, it will be understood by those skilled in the art that various changes and modifications can be made therein without departing from the scope of the invention as defined in the appended claims.

What is claimed is:

1. An assembly for absorbing energy between first and second tubes subject to relative movement, the combination comprising:

a first guide ring rigidly coupled to the inside of the first tube, having an inner diameter substantially equal to the outer diameter of the second tube and receiving the second tube therein;

a cutting ring coupled to the inside of the first tube by shearable fasteners spaced from said first guide ring, said cutting ring having an inner surface defining an annular cutting edge with a diameter less than the outer diameter of the second tube, the second tube having an area of reduced diameter receiving said cutting edge therein; and a second guide ring rigidly coupled to the second tube and received in the first tube on the side of said cutting ring opposite from said first guide ring, said second guide ring having an outer diameter substantially equal to the inner diameter of the first tube, shearable means, coupled to the first tube and said second guide ring, for coupling said second guide ring to the first tube, whereby, upon subjection of the two tubes to relative movement, said cutting edge cuts into a layer of the second tube thereby absorbing at least a part of the energy tending to relatively move the two tubes.

2. An energy absorbing assembly according to claim 1, wherein
the second tube has a plurality of longitudinal grooves in the outer surface thereof.

3. An energy absorbing assembly according to claim 1, and further comprising
a spacing ring interposed inside the first tube between said cutting ring and said first guide ring, the inner diameter of said spacing ring being greater than the diameter of said cutting edge and greater than the outer diameter of the second tube.

* * * * *